United States Patent
Chen et al.

[19]

[11] Patent Number: 5,923,778
[45] Date of Patent: Jul. 13, 1999

[54] HIERARCHICAL REPRESENTATION OF REFERENCE DATABASE FOR AN ON-LINE CHINESE CHARACTER RECOGNITION SYSTEM

[75] Inventors: Ju-Wei Chen; Kai-Hsiang Chou; Suh-Yin Lee, all of Hsinchu, Taiwan

[73] Assignee: Industrial Technology Research Institute, Hsinchu, Taiwan

[21] Appl. No.: 08/662,854

[22] Filed: Jun. 12, 1996

[51] Int. Cl.⁶ .............................. G06K 9/18; G06K 9/00; G06K 9/46; G06K 9/62

[52] U.S. Cl. .......................... 382/185; 382/187; 382/202; 382/209

[58] Field of Search .................................. 382/185, 187, 382/201, 209, 218, 197, 186, 202, 203, 217, 240; 395/10, 11, 50, 54, 60; 704/8, 10; 707/104

[56] References Cited

U.S. PATENT DOCUMENTS

| | | | |
|---|---|---|---|
| 4,689,743 | 8/1987 | Chiu ........................................... | 341/20 |
| 4,718,102 | 1/1988 | Crane et al. ............................. | 382/185 |
| 4,990,903 | 2/1991 | Cheng et al. ............................ | 345/471 |
| 5,212,769 | 5/1993 | Pong ........................................ | 345/467 |

OTHER PUBLICATIONS

Luo, Zheng and Wu,Chwan–Hwa, "A Unit Decomposition Technique Using Fuzzy Logic for Real–Time Handwritten Chinese Character Recognition", IEEE Transactions on Industrial Electronics, vol. 44, No. 6, pp. 840–847, Dec. 1997.

*Primary Examiner*—Joseph Mancuso
*Assistant Examiner*—Ha Tran Nguyen
*Attorney, Agent, or Firm*—W. Wayne Liauh

[57] ABSTRACT

A hierarchical database system for on-line Chinese character recognition is disclosed. The hierarchical database system comprises: (1) the database of character description; (b) the database of stroke correspondence rules of components; (3) the database of character structures; (4) the database of standard component patterns; and (5) the database of spatial relationships between strokes of components. The database of character description stores the rule code(s) of the constituent component(s) and the character structure for all the characters included in the vocabulary. The database of stroke correspondence rules of components stores stroke correspondence rules for all the components denoted by the above mentioned rule codes. The database of character structure stores the synthesis rules of character patterns, the decomposition rules of character structures, and the spatial relationships between components, for all the 208 character structures utilized in a preferred embodiment. The database of standard component patterns stores the coordinates of extreme points of line segments constituting the standard patterns of components. And the database of spatial relationships between strokes of components stores the spatial relationships between strokes of each component. When an input script is matched against a template character, the input script is decomposed into constituent component(s) according to the decomposition rule of that character described as a rule code (stored in the database of character description). Then, the stroke correspondence rules are retrieved from the database of stroke correspondence rules of components via the rule code(s) of that template character. After the matching is completed at the stroke level, the character distance is computed using the database of spatial relationships between strokes of components and the character pattern, which can be synthesized using the database of standard component patterns and the database of character structures. The present invention also discloses a method of finding the best decomposition rule of components for each character, by which various "geometric features" of strokes and possible decomposition sequences are taken into consideration to thereby derive the best rule for each character for minimizing the number of erroneously decomposed strokes.

16 Claims, 9 Drawing Sheets

Original

Hierarchical Representation
Components

Characters

Synthesis Rules

Original

Hierardical Representation
Components

□ : l m
七Z : o p
木 : q r s

Characters

Original

㐬 : 6 stroke correspondence rules.

哈 : 7 stroke correspondence rules.

Fig. 5(a)

Hierardical Representation

Components

口 : 3 stroke correspondence rules.

㐬 : 3 stroke correspondence rules.

禾 : 4 stroke correspondence rules.

HIERARCHICAL REPRESENTATION OF REFERENCE DATABASE FOR AN ON-LINE CHINESE CHARACTER RECOGNITION SYSTEM

FIELD OF THE INVENTION

The present invention relates to an improved on-line Chinese character recognition system. More specifically, the present invention relates to a hierarchically structured reference database for use in an on-line handwritten Chinese character recognition process which allows the required data storage space to be substantially reduced, and the method of using the same. The system disclosed in the present invention is most advantageously used in portable computing devices such as personal digital assistants (PDAs), where memory storage space is at a premium. The hierarchically structured reference database system disclosed in the present invention can also be advantageously utilized, either alone or in conjunction with another program, for generating Chinese-charactered screen or printer fonts on-the-fly without requiring large memory storage space. This secondary utility of the present invention allows both Chinese-character-based and non-Chinese-character-based operating systems to acquire the ability of conveniently displaying and printing Chinese characters.

BACKGROUND OF THE INVENTION

On-line Chinese character recognition (OLCCR) systems provide a conduit of man-computer interfaces for Chinese-character-based operation systems and/or applications; they can be used alone, but are typically used in conjunction with other application software programs. Unlike the English language, which consists of 26 letters and a few punctuation, the Chinese language is a large-vocabulary language comprising literally tens of thousands of "characters" (i.e., words), which are further combined to become meaningful phrases. A Chinese character will not be recognized if it does not exist in the reference database. Therefore, a very large reference database would be required in developing a character recognition system for Chinese characters. This may not possess a problem for-off-line character recognition systems. However, the data size (for storing template characters against which the input script can be compared) becomes a very significant issue for on-line character recognition systems, especially when the character recognition systems are to be used in portable devices such as personal digital assistants (PDAs). In order to increase the "vocabulary" of a portable device so as to thereby increase the usefulness of the character recognition system, it is important to develop a method which can substantially reduce the memory space required for storing a very large number of reference (i.e., template) Chinese characters.

While the written Chinese language comprises such a huge number of characters, essentially all of them can be decomposed into a combination of "components", which are sometimes called "radicals". Thus, although there are essentially an infinite number of possible Chinese characters, there exist only a limited number of components. In most cases, a "component" is also a character itself, but of a much simpler construction. Since all the characters share a significantly smaller number of components, it is, theoretically, possible to store the components rather than the characters to reduce the memory space requirement. However, this is complicated by the fact that, in Chinese characters, the arrangement of the components (i.e., the spatial relationship between or among the components) is not linear as in, for example, the English language. Rather, the components in Chinese characters are arranged in a two-dimensional relationship—the arrangement can be top-down, left-right, outside-inside, or, in many circumstances, combinations thereof. Moreover, the dimension of one component can be substantially larger or smaller, two-dimensionally speaking, than other components of the same character. This can be a result of the intrinsic characteristics of the character itself, or as a result of a personal writing habit. These factors make the development of an on-line component-based character recognition system extremely difficult.

Lu and Suen proposed a hierarchical attributed graph representation for off-line hand-written Chinese characters. In their approach, each component is represented by an attributed graph, in which each vertex stands for a stroke. Each character is also represented by an attributed graph, in which each vertex stands for a component. A hierarchical attributed graph matching is then developed for character recognition. This method does not result in a substantial saving in the memory storage space when the reference data contains a large number of template characters.

Shiau et al proposed an on-line Chinese character recognition system which utilizes a hierarchical representation. Their system involves a fixed stroke number and a fixed stroke order, by which each component is represented by a string of symbols, which contain the information of basic stroke types and the spatial relationship between two contiguous strokes. Each Chinese character is then represented by the constituent components. When a character is retrieved from the reference database for character matching, the string of symbols of the character can be obtained by concatenating the symbol strings of the constituent components.

Morishita et al proposed a method for Chinese/Japanese character recognition (Japanese characters share many common strokes with Chinese characters), in which the stoke number and the x and y coordinates of the center points of the strokes are utilized to decompose the components contained in a character, of which the components are assumed to have a left-to-right or top-to-bottom relationship. The method developed by Morishita et al can be applied recursively to correctly decompose the constituent components from characters with complicated structures, but it fails for characters with connected strokes.

Correct decomposition of radicals (i.e., components) is a difficult but critical procedure for an on-line Chinese character recognition without writing constraints (such as stroke order and stroke number) using a hierarchical reference database. To some extent, the same problem is experienced in the off-line Chinese character recognition system. In the development of off-line Chinese optical character recognition (OCR) systems, the extraction of radicals has been investigated by many researchers. Typically, the background information of a handwritten character is utilized to separate radicals. However, in the conventional approach, radicals that touch each other or are inherently connected cannot be satisfactorily separated. Cheng and Hsu proposed a method for separating radicals according to the heuristics of the stroke connections. About 75% of the most frequently used Chinese characters can be divided into two parts by means of this separating strategy. However, the remaining 25% of the Chinese characters must be processed according to other special rules. Other researchers have proposed off-line Chinese character recognition methods which utilize relaxation and graph matching methods to identify radicals. These methods, however, are computation intensive.

As discussed above, although a hierarchically structured component-based Chinese character recognition system may substantially reduce the memory space requirement, thus facilitating the development of an on-line system for portable devices with limited hardware resource, because of the complexity of the Chinese characters which involve two-dimensional spatial relationships of the constituent components and the variable component size, no such system has been successfully developed.

The primary object of the present invention is to develop an improved on-line Chinese character recognition system which can be used for portable computing devices with limited hardware resources such as personal digital assistants. More specifically, the primary object of the present invention is to develop an improved on-line Chinese character recognition system, which includes a hierarchically structured reference database and a method of using the same, for use in an on-line handwritten Chinese character recognition process which allows the required data storage space to be substantially reduced while providing excellent character recognition efficiency. The system disclosed in the present invention can also be advantageously utilized to generate an essentially infinite number of Chinese-character-based print and/or screen fonts.

The present invention discloses an improved on-line Chinese character recognition system which includes a novel hierarchically structured database for storing template Chinese characters, against which an input handwritten Chinese script will be compared and recognized. The improved on-line Chinese character recognition system is a rule-based system and the method of the hierarchical representation of the template Chinese characters involves storing (i.e., describing) the template characters as comprising three major parts: character patterns, spatial relationships between strokes, and stoke correspondence rules, all according to a hierarchical structure.

With the method disclosed in the present invention, instead of storing the stroke correspondence rules of each and every character, the stroke correspondence rules of components are stored in the reference (i.e., template) database. Each template character (of the vocabulary of characters) is described by: (1) its constituent component codes and (2) the character composition structure. The character composition structure is also called the "character structure", which describes the spatial relationship of its constituent components. In the present invention, which involves a rule-based system, a handwritten character is compared against a template character according to whether the handwritten character conformed to a set of rules defining the template character. In retrieving the rules of a character, the rules of its constituent components are fetched according to a predefined sequence associated with that template character. The use of such a predefined sequence is necessary for Chinese characters because of the complex spatial relationship between the components. In most written languages, for example the English language, the constituent letters of a word are arranged only linearly in one direction, i.e., from left to right. For Chinese characters, the constituent components are arranged in various two-dimensional manners, from left-to-right, top-to-bottom, outside-to-inside, or even combinations thereof Thus one or more predefined sequences are necessary in order for the components (or, more specifically, the rules of the constituent components) to be extracted (or retrieved) from a character. The provision of the series of predefined sequences for extracting components from a character is an important element of the system disclosed in the present invention.

In the present invention, the three major parts (i.e., character patterns, spatial relationships between strokes, and stoke correspondence rules) which collectively define a character are themselves defined as comprising the following five items, or databases:

(1) the database of character description;

(2) the database of stroke correspondence rules of components;

(3) the database of character structures;

(4) the database of standard component patterns; and (5) the database of spatial relationships between strokes of components.

The database of character description stores the character structure and component codes for each template character. The database of stroke correspondence rules of components stores the stroke correspondence rules for the strokes contained in every component. The database of character structures stores a number of information for constructing a character from, or decomposing into, its constituent components, including the synthesis rules for the character patterns (i.e., the synthesis rules at the character level from the constituent components), the decomposition rules of components for each character structure, and the spatial relationships between the components for each character structure. The database of component patterns stores the normalized standard component patterns. Finally, the database of spatial relationships between stokes of components stores the spatial relationships between stokes of each component.

In the method disclosed in the present invention for recognizing handwritten Chinese characters, a template Chinese character is first retrieved from the hierarchical structured reference database. In the database of character description, each template character is represented by the rule code(s) of its constituent component(s) and the character structure associated therewith. The database of stroke correspondence rules of components contains stroke correspondence rules for all the components, which are denoted by the rule codes. The rule codes (of components) provide the connection to form a hierarchical relationship between the character (as in the database of character description) and the strokes (as in the stroke correspondence rules of the components) for saving the required memory storage space. However, the actual task is actually much more complicated. As described before, because of the unique complicated two-dimensional relationships between the constituent components in Chinese characters, two other links, in the form of two separate databases, are provided in the present invention to ensure the workability of the hierarchical relationship between the characters and the stroke correspondence rules of components. One is the database of character structures, which contains the synthesis rules of the character patterns, the decomposition rules of character structures and the spatial relationships between the components in a character. The other is the database of standard component patterns (pattern codes) which stores the coordinates of extreme points of line segments, which constitute the standard patterns of components. A component will have only one pattern code, but may have more than one rule code. A mapping table is provided to store the mapping relationships between the rule code(s) and a pattern code.

When an input script is matched against a template character, the input script is decomposed into one of more components (described as component codes), in accordance with the decomposition rule of that character (via the database of character description and the database of character structure). A number of decomposition rules are stored in the database of character structure to suit the various writing styles. Once the component codes are extracted, the stroke correspondence rules are retrieved, via the database of stroke correspondence rules of components. From the rule code(s), which allow the best match of strokes to be obtained, the corresponding pattern code(s) can be retrieved via the mapping table. Alternatively, the standard component pattern(s) can also be retrieved via the pattern code(s). By using the standard patterns of the constituent components in conjunction with the synthesis rules of the character structure, the user can also synthesize the standard pattern of the template character. Thus, the database system disclosed in the present invention can also be advantageously utilized to generate Chinese characters on-the-fly for screen display or printing hard copies.

In a preferred embodiment of the present invention, which was based on a collection of 5,401 of the most frequently used Chinese characters, a hierarchical database system disclosed in the present invention has been shown to be able to reduce the required memory storage space by almost 75%, while providing the same or better recognition accuracy. Thus, the present invention presents an important avenue by which portable computing devices with limited hardware resources such as personal digital assistants can utilize to provide on-line character recognition for users of Chinese characters. While the system developed in the present invention provides the most advantageous utility for Chinese character-based word processors, it can also be utilized, in conjunction with any software application program, including those English and/or other non-Chinese character based word processors, to provide the capability of inputting, displaying, and printing Chinese characters without substantially inflating the program size. Furthermore, the method disclosed in the present invention can be applied to other non-Chinese languages which involve non-linear arrangements of character components, such as the Japanese and Korean language. Additionally, because of the efficient use of memory space, the hierarchical database system structure developed in the present invention can be conveniently embedded into a firmware for use with a printer, which can be a dot matrix printer or preferably a laser printer, so as to facilitate Chinese character printing capability without incurring large memory requirement.

BRIEF DESCRIPTION OF THE DRAWING

The present invention will be described in detail with references to the drawings showing the preferred embodiment of the present invention, wherein.

DETAILED DESCRIPTION OF THE PREFERRED EMBODIMENT

The present invention discloses an improved on-line Chinese character recognition system which can be used for portable computing devices with limited hardware resources such as personal digital assistants. In the present invention, a novel hierarchically structured reference database is developed for use in an on-line handwritten Chinese character recognition process which allows the required data storage space to be substantially reduced while providing excellent character recognition efficiency. A secondary application of the hierarchically structured reference database disclosed in the present invention is that it can also be advantageously used to generate Chinese characters on-the-fly for printing and screen displaying.

Figure 1:
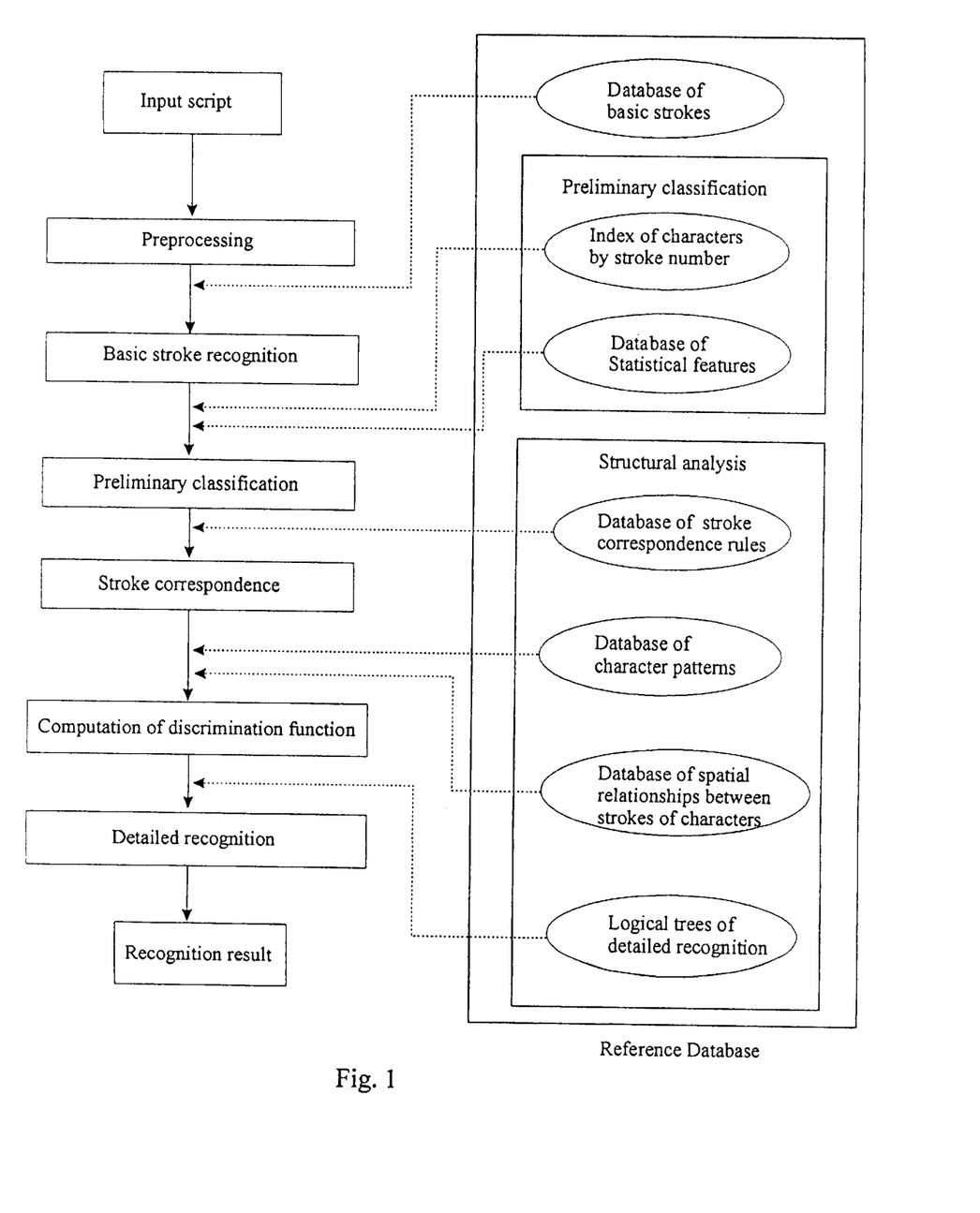
FIG. 1 is a schematic diagram showing the architecture of a rule-based on-line Chinese character recognition system.

FIG. 1 is a schematic diagram showing the architecture of a rule-based on-line Chinese character recognition system utilized in the present invention. A more detailed description is disclosed in a co-pending application Ser. No. (to be entered by Applicant later), the content of which is incorporated by reference. Chinese characters can be considered as being constructed with a collection of basic strokes according to a myriad of two-dimensional structural rules. Therefore, in developing a technique for Chinese character recognition, we can establish a reference database containing the necessary basic strokes for character matching, and a set of stroke correspondence rules are provided for all the characters in the included vocabulary, against which an input script will be matched to obtain accurate recognition. The rule-based on-line Chinese character recognition system as shown in FIG. 1 thus includes more than one processing module and the necessary reference database(s) ah handwritten input Chinese character is first processed by a preprocessing procedure, after which the basic strokes are preliminarily recognized.

After the basic strokes are recognized, the estimated range of possible stroke numbers (i.e.,the number of strokes) of the input characters and the statistical features of the input character are utilized in a preliminary classification procedure to reduce the number of characters in the reference database that will be processed in the later stage of structural matching (structural analysis). The processing steps of structural analysis include the steps of stroke correspondence (i.e., rule-based stroke correspondence), computation of discrimination functions, and detailed recognition. In the reference database, the information in the structural analysis contains stroke correspondence rules, character patterns, spatial relationships between strokes of the characters, and logical trees for detailed recognition. This architecture can be applied to recognizing characters written in other styles. When the style of the characters to be recognized changes, only the rules in the reference database need to be changed. The accuracy of Chinese character recognition is dictated by the inclusiveness of the vocabulary of the database. A Chinese character will not be correctly recognized if it is not in the included vocabulary. On the same token, a Chinese character will not be printed or displayed if it is not one of the characters already built in the character database. Thus, a very large reference character database is needed to achieve desired accuracy and applicability.

Figure 2A:
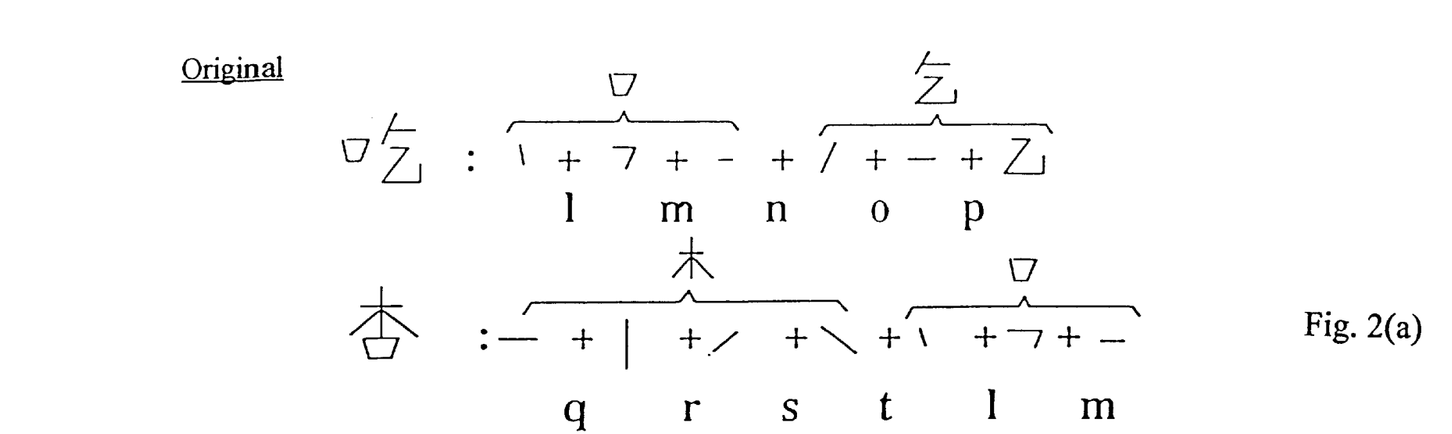
FIG. 2a describes the stroke representations of the Chinese characters 乙,冬, without hierarchical structuring.

FIG. 2a describes the stroke representations of the Chinese characters ·乞 and 右 respectively, without hierarchical representation. The characters ·乞 has six strokes and the character 右 has seven strokes. Therefore, for the two characters ·乞 and 右, there are 13 stroke patterns (i.e., rules of stroke correspondence) that need be stored. Furthermore, FIG. 2a also shows the spatial relationships between strokes of character ·乞 which are denoted by symbols l, m, n, o, p, and the spatial relationships between strokes of character 右, which are denoted by symbols q, r, s, t, l, m. A straight stroke consists of one line segment, and a curved stroke may contain more than one line segment. Each character pattern can also be described by its constituent line segments, and the coordinates of the extreme points of the constituent line segments will need be stored in the reference database for each character pattern. With a reference database containing 5,401 of the most frequently used Chinese characters, the number of strokes (of a Chinese character) range from 1 to 32, and the total number of strokes is 65,843 (about 64.3K). For a straight stroke, four bytes are needed to store the stroke pattern, and more than four bytes are needed for a curved stroke. Thus, at least 250 Kbytes will be required to store the stroke patterns for the 5401 Chinese characters.

Figure 2B:
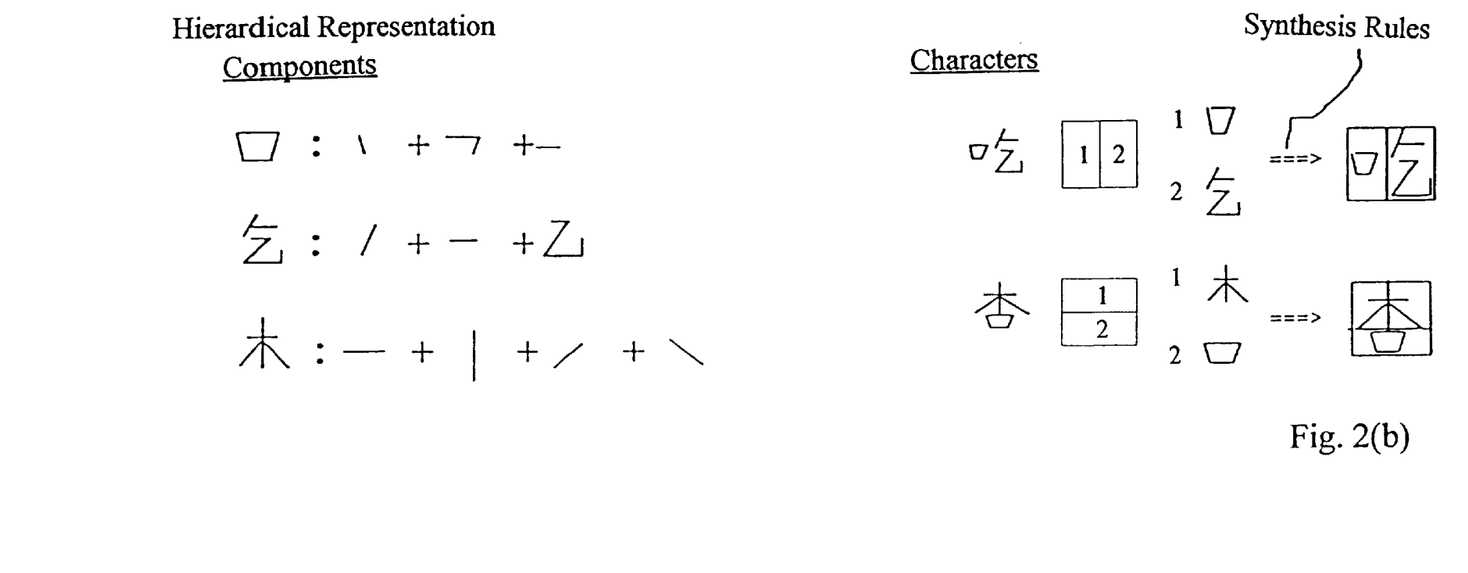
FIG. 2b describes the stroke representations of the Chinese characters 乙,冬, with hierarchical structuring.

FIG. 2b describes the stroke representations of the Chinese characters ·乞 and 右, with hierarchical structuring. With the system disclosed in the present invention, the stroke correspondence rules of the constituent components, instead of the stroke correspondence rules of each character, are stored in the reference (i.e., template) database. In the hierarchical representation disclosed in the present invention as shown in FIG. 2b, the Chinese character ·乞 consists of the components ヒ and 乙, the Chinese character 右 consists of the components ナ and 口. Altogether, only ten strokes need to stored. Although extra memory space will be required to store the synthesis rule and the constituent components for each character, the net result is a substantial reduction of the required memory storage space, and the greater the size of the included vocabulary of characters, the more substantial is the amount of savings.

In the hierarchical representation disclosed in the present invention, each template character (of the vocabulary of characters stored in the reference database) is described by: (1) its constituent component codes and (2) the character composition structure, which is also called the character structure (i.e., the spatial relationship between the constituent components). In retrieving the rules of a character, the rules of its constituent components are first extracted according to a predefined sequence associated with that template character. Using such a predefined sequence is necessary for Chinese characters because of the complex spatial relationship between the components. Most of the constituent components of the Chinese characters are arranged in complex two-dimensional manners, from left-to-right, top-to-bottom, outside-to-inside, or combinations thereof Thus a predefined sequence is required in order for the components to be stably extracted from a character.

Figure 3:
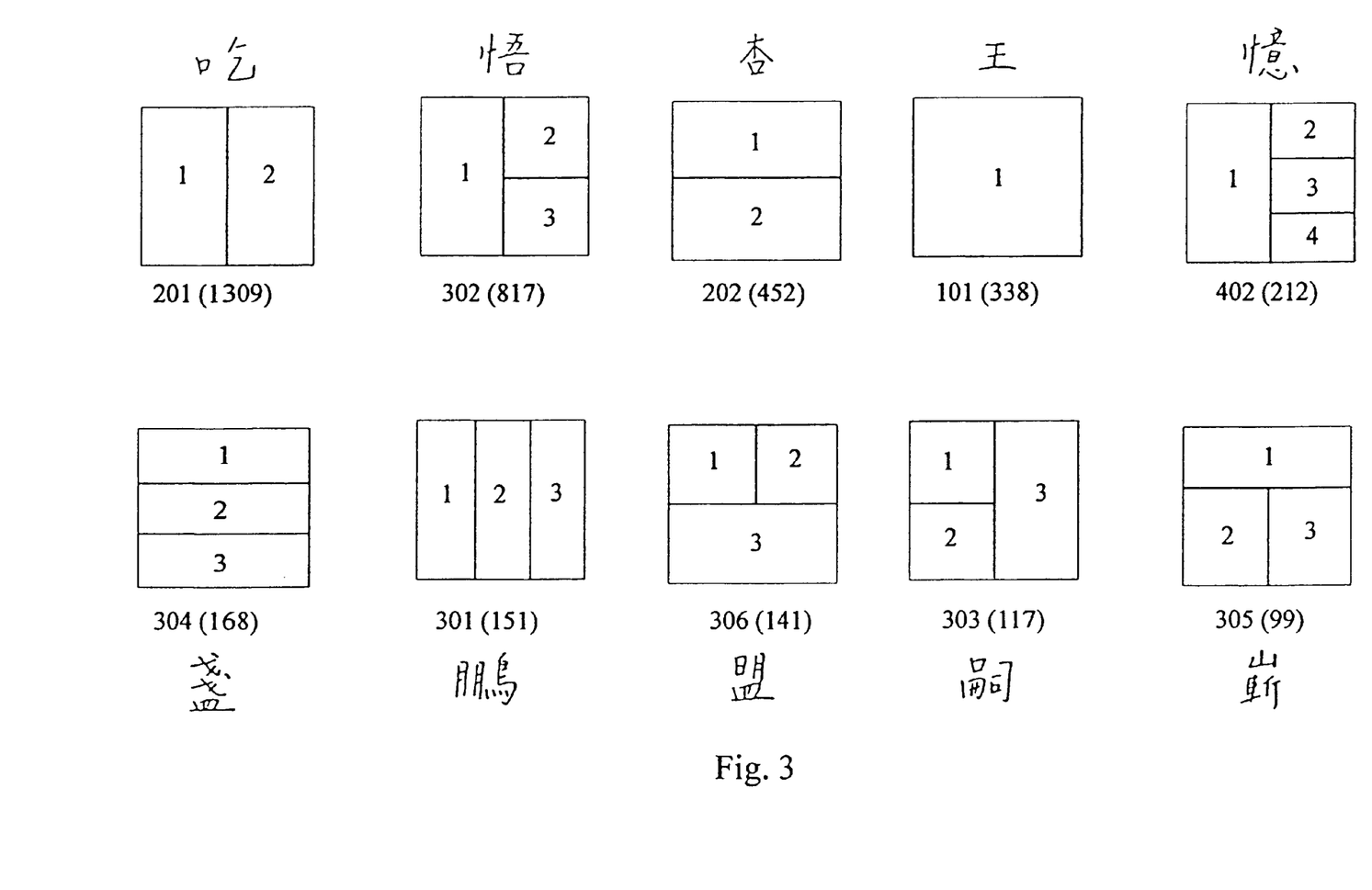
FIG. 3 shows the geometric configurations of ten Chinese character structures with the highest frequency of occurrence; each character structure is labeled with a "character structure code", followed by its frequency of occurrence in parentheses.

In a first preferred embodiment of the present invention, 5401 of the most frequently used Chinese characters were decomposed into 622 constituent components, such as 土, 十, and 口; and 208 character structures (i.e., the two-dimensional stacking order, or geometrical configuration, of the constituent components) were also established to describe these 5401 characters. The 622 components were classified into 17 component groups, based on the number of strokes (or "stroke number") contained therein. In an embodiment of the present invention, each component was coded by a 5-digit code (other digits are also possible). The first two digits representing the stroke number of that component, and the last three digits representing the seriatim order (which can be arbitrary or based on the occurrence frequency) of that component in the same component group (i.e., with the same stroke number). Likewise, all the Chinese character structures (a character structure is the way by which the constituent components of a character are two-dimensionally arranged) were classified into 7 character structure groups based on the number of components (or "component number") contained therein. Each character was coded by a 3-digit "character structure" code (other digits are also possible), the first digit representing the component number in that character, and the last two digits representing the seriatim order (which again can be arbitrary or based on the occurrence frequency) of that character structure in the same character structure group (i.e., with the same component number). FIG. 3 shows the two-dimensional geometric configurations of the ten most frequently encountered Chinese character structures; each character structure is labeled with a character structure code followed by its frequency of occurrence in parentheses. In this preferred embodiment, the geometric configuration, having a character structure code of 201, has the highest frequency of 1,309. That is, this two-dimensional character structure, or the geometric configuration, is shared by 1,309 Chinese characters.

With the hierarchical representation of the preferred embodiment described above, the total number of strokes that need to be stored for the 622 components is 3,331. The data size for storing the component patterns is about 13 Kbytes. On the average, each character contains 2.7 components. Since each component is coded by a 5-digit code and two bytes are needed for storing a 5-digit code, the entire 5401 characters thus requiring about 30 Kbytes to store all the component codes as a linear array. Each character is given two bytes to store the entry address in that linear array, from which the component code(s) are to be retrieved. Additionally, four bytes are needed to store the related information of the character structure for each character. The above two items thus required a memory storage space of about 32 Kbytes for the 5401 Chinese characters. The space required by the synthesis rules of the character patterns was about 60 Kbytes. Thus, the total data size to store the character patterns was about 135 Kbytes using the hierarchical representation disclosed in the present invention, as opposed to about 250 Kbytes that would be required without the hierarchical representation. This represents a reduction rate of about 50% in the required memory storage space.

Figure 4A:
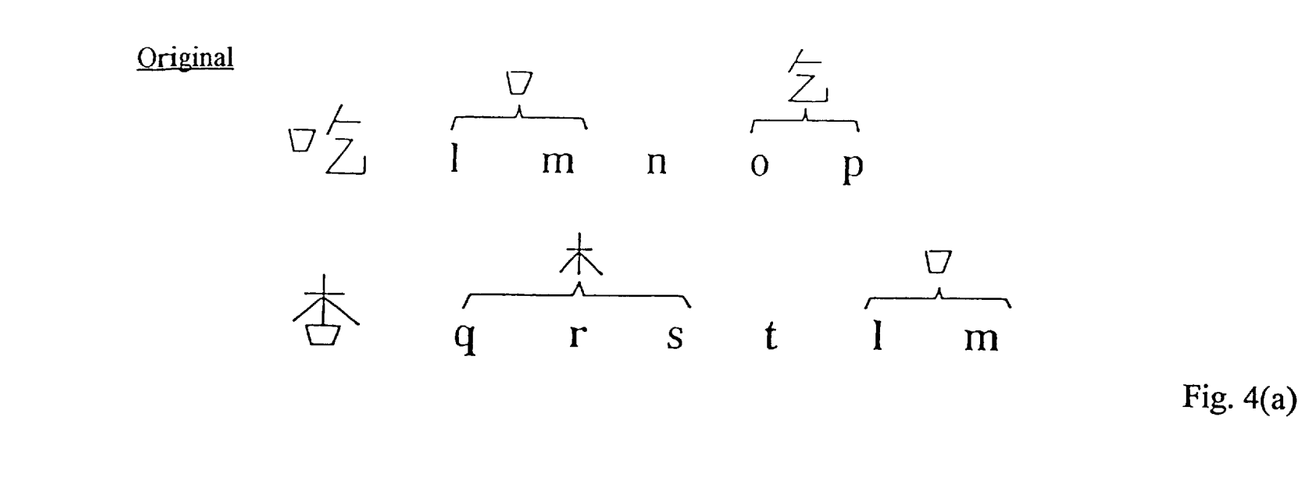
FIG. 4a shows the representations of spatial relationships between strokes in the Chinese characters 乙 and 冬, without hierarchical structuring.
Figure 4B:
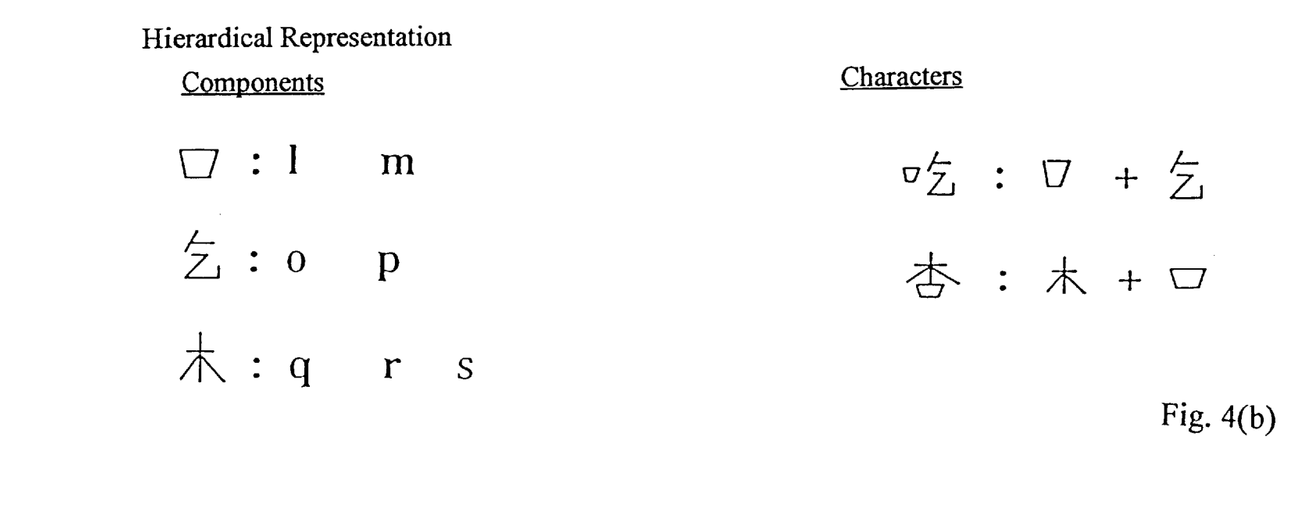
FIG. 4b shows the representations of spatial relationships between strokes in the Chinese characters 乙 and 冬, with hierarchical structuring.

In the first preferred embodiment of the present invention, the hierarchical representation was also applied to the spatial relationships between the strokes. FIG. 4a shows the representations of spatial relationships between strokes in the Chinese characters 氵 and 言, without hierarchical structuring. About 250 Kbytes of memory storage space were required for storing the spatial relationships between strokes for the characters without the hierarchical representation. FIG. 4b shows the representations of spatial relationships between strokes in the Chinese characters 氵 and 言, with the hierarchical structuring disclosed in the present invention. The memory storage space requirement for storing the spatial relationships between strokes for all the 622 components was reduced to about 13 Kbytes, representing a reduction of about 94%.

As discussed earlier, the three major parts in the present invention which define a character can be described as comprising five databases, namely: (1) the database of character description, (2) the database of stroke correspondence rules of components; (3) the database of character structures; (4) the database of standard component patterns; and (5) the database of spatial relationships between strokes of components. The database of character description stores the character structure and component codes for each template character. The database of stroke correspondence rules of components stores the stroke correspondence rules for each component. The database of character structures stores a number of information for constructing a character, including the synthesis rules for character patterns, the decomposition rules of components for each character structure, and the spatial relationships between the components for each character structure. The database of component patterns stores the normalized standard component patterns. And the database of spatial relationships between stokes of components stores the spatial relationships between stokes of each component. The above discussions concern reducing the storage space requirement for the database of character structures. The hierarchical representation disclosed in the present invention can also be applied to the stroke correspondence rules.

Figure 5A:
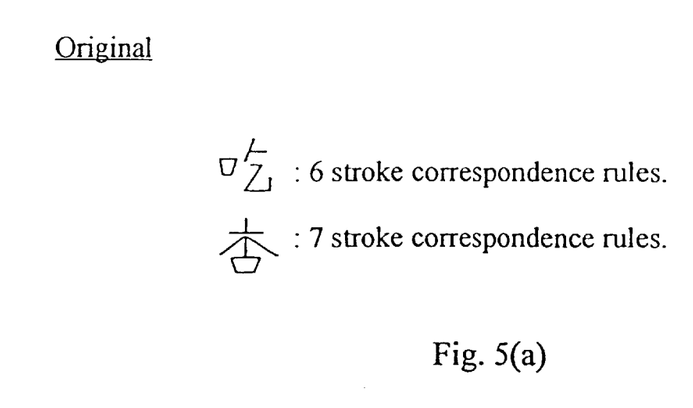
FIG. 5a is schematic flowchart diagram showing the steps of applying the stroke correspondence rules for the Chinese characters 乙 and 冬 without hierarchical structuring.
Figure 5B:
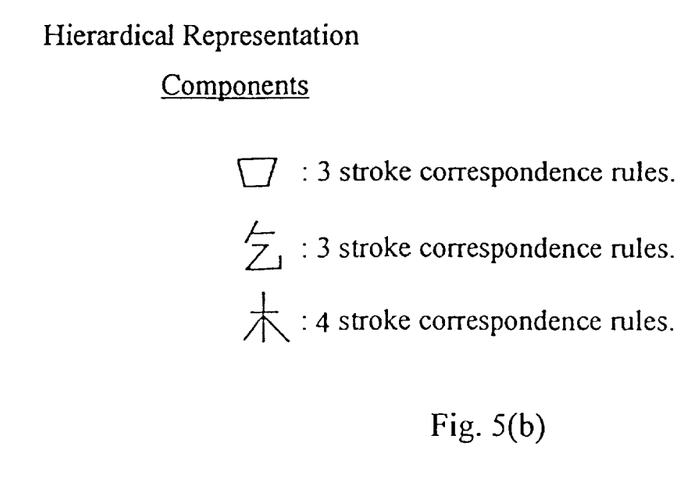
FIG. 5b is schematic flowchart diagram showing the steps of applying the stroke correspondence rules for the Chinese characters 乙 and 冬 with hierarchical structuring.

In using the method disclosed in the present invention, a template Chinese character is retrieved from the hierarchical structured reference database. In the database of character description, each template character is represented by the rule code(s) of its constituent component(s) and the character structure. Each component rule code represents a set of stroke correspondence rules for that component. When an input script is being matched against a template character in the database, all the components associated with that template character are decomposed, one by one, and each decomposed component is further decomposed, stroke by stroke, according to the stroke correspondence rules. FIG. 5a is schematic flowchart diagram showing the the stroke correspondence rule of the Chinese characters 氵 and 言 without hierarchical structuring. And FIG. 5b is schematic flowchart diagram showing the the stroke correspondence rule of the Chinese characters 氵 and 言 with hierarchical structuring. Without the hierarchical representation, 13 stroke correspondence rules need to be stored for these two Chinese characters. With the hierarchical representation, the number of stroke correspondence rules that need to be stored is reduced to 10. Because only 622 components are required to store the 5401 Chinese characters, the amount of reduced space requirement can be very significant. However, each character is constructed from components based on its unique two-dimensional spatial relationships between the components; a correct decomposition of the constituent components from a character is an essential procedure for utilizing the hierarchically structured reference databases.

The procedure of decomposing a component from an input character script involves the steps of determining which strokes belong to the target component. This procedure can be described as decomposition of components or "radical separation". In the present invention, if the decomposition is correct (i.e., the decomposed strokes truly belong to the target component), then these decomposed strokes are called correctly decomposed strokes (or correct decomposition strokes). On the other hand, if the decomposition procedure causes one or more foreign strokes (i.e., those strokes that do not belong to the target component) to be included in the decomposed component, or some of the "native" strokes to be excluded from the target component, then these excess or missing strokes are called erroneously decomposed strokes (or erroneous decomposition strokes). The ratio between the correct decomposition strokes and the total number of strokes in the decomposed component is called correct decomposition rate, and the ratio between the erroneous decomposition strokes and the total number of strokes in the decomposed component is called erroneous decomposition rate. Because the step of component decomposition provides an important link in accurately accomplishing the stroke correspondence, the correct decomposition rate should preferably reach 100%. On other hand, the procedure of component decomposition preferably should be designed such that the erroneous decomposition rate approaches zero. The lower the erroneous decomposition rate, the easier it is to design the stroke correspondence rules.

The procedure for retrieving the stroke correspondence rules disclosed in the present invention does not have constraints on both the stroke number and the stroke order. Intuitively, for characters with connected strokes, the occupied area of strokes in a normalized character can be utilized in the decomposition of components. When the area occupied by a target component is represented by a rectangular window, those strokes that are located within this window can be identified as the strokes belonging to that component. In recognizing handwritings, there are typically many variations in the component size and relative component locations in a character. If a large enough window is utilized for decomposing a component from a character, then the correct decomposition rate would easily reach 100% even for those characters with components of greatly varying sizes. However, too large a window may include some erroneous strokes, and too small a window may lose some native strokes, increase erroneous decomposition rate, and cause the design of stroke correspondence to be more difficult.

Figure 6:
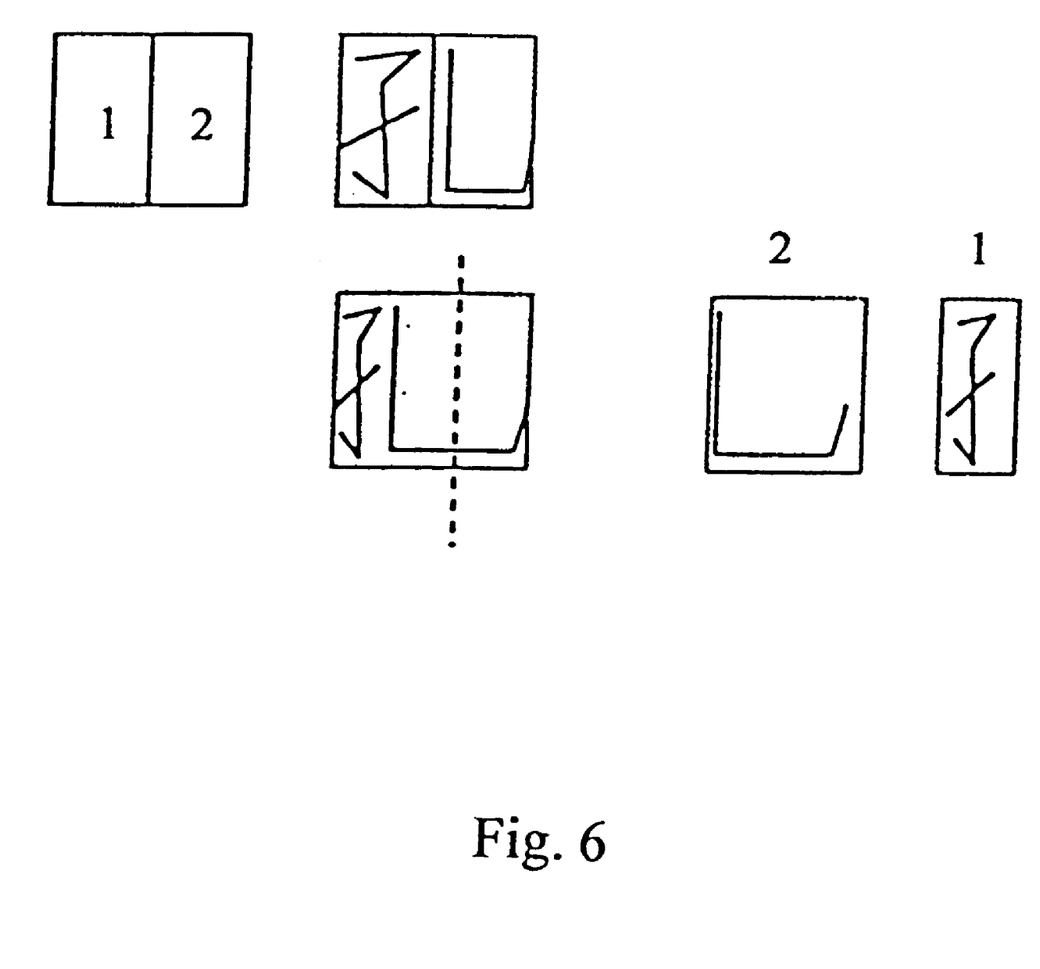
FIG. 6 shows the use of an alternative component decomposition sequence to improve the stability of decomposition result of the Chinese character.

In the present invention, a novel method is disclosed for implementing the rules for retrieving the stroke correspondence rules in a hierarchical representation. In this method, the knowledge of character structures is utilized apriori. A variety of the so-called "geometric feature measures of strokes" as well as a variety of decomposition sequences of components are utilized, in cooperation thereof, to minimize the number of erroneous decomposition strokes in a character. FIG. 6 illustrates how the use of an alternative component decomposition sequence can improve the stability of decomposition result of the Chinese character (i.e., reduce the erroneous decomposition strokes). As shown in FIG. 6, a high erroneous decomposition rate would result if the character 汕 is decomposed according to the natural decomposition sequence (i.e., from left to right). In FIG. 6, the right-hand side component was exaggerated due to a personal writing habit. However, if component 2 of the same handwritten character is decomposed before component 1, and the geometric feature measure of strokes MBR_Xmax is utilized to decompose component 2, then the erroneous decomposed-stroke can be avoided even though the handwritten input script contains components that are large out of proper proportion. An accurate decomposition makes the job of designing stroke correspondence rules easier.

Detailed descriptions of using the geometric feature measures in stroke correspondence rules for stoke correspondence are described in the co-pending application Ser. No. (to be subsequently supplied by the Applicant). For example, the geometric feature measures of a stroke can be the coordinates (normalized) for representing the position of a stroke in a normalized character. Each stroke can be considered to be bound by a minimum bounding rectangle (MBR). The coordinates of its four boundaries are MBR_Xmin, MBR_Ymin, MBR_Xmax, MBR_Ymax, respectively. The coordinates of the center point of the MBR are MBR_Xcenter and MBR_Ycenter. The six coordinates, which constitute the geometric feature measures of a stroke, can be classified into x and y geometric measures. For character structures with left-right relationships, only the x measures are used in the component decomposition. Likewise, for character structures with top-down relationships, only the y measures are used in the component decomposition. Many other geometric feature measures can also be utilized, as described in the co-pending patent application described above.

A rectangular window is utilized to represent the area occupied by the geometric feature measures of the strokes belonging to a decomposed component. The four boundaries of a window are derived from the template character. In the decomposition procedure, the left and right boundaries are used by the x measures, and the top and bottom boundaries are used by the y measures. Since there are inevitably many variations in the relative component sizes in a handwritten character, a tolerance zone of width δ is chosen to provide additional area around the window so selected so that greater tolerations in the relative component size can be accommodated.

The sequence of component decomposition is a very important element in the present invention. When a character structure consists of k components, there will be k! possible sequences of component decompositions. However, some constraint can be placed on the possible sequences of component decomposition to reduce the computation time required for finding the best decomposition rules. For example, when a character structure contains surrounding component(s) and central component(s), the erroneous decomposition rate would be lower if the decomposition is carried out from the surrounding component(s) to the central component(s) than if the decomposition is carried out from the central component(s) to the surrounding component(s). Also, according to the human writing habits, the strokes are usually written from top to bottom, from left to right, and from surrounding to central. Based on these human habits, one of the decomposition sequences is defined as the "natural sequence" of component decomposition for each character structure.

In order to minimize the erroneous composition rate of a character, a variety of geometric feature measures of strokes as well as a variety of component decomposition sequences are utilized in the construction of the reference database of a recognition system for finding the best decomposition rule of each character. The combination of the set of geometric feature measures of strokes and the sequence of component decomposition which minimizes the erroneous decomposition rate will be accepted as the "rule of component decomposition". The algorithm of finding the rule of component decomposition is provided in the discussions that follow.

The character structure of a Chinese character A is denoted as α. For the character structure α, there are L components, N possible decomposition sequences (with the appropriate constraints), and M possible sets of geometric feature measures of strokes to be utilized in the component decomposition process. The value of M can be obtained from the following relation:

$$M = \sum_{i=1}^{L} |M_i| \qquad \text{Eqn. 1}$$

where $M_1$ is the set of possible feature measures of the ith component to be used to decompose the component, and | | indicates the cardinality of a set. A set of handwritten samples are used in deriving the rule of component decomposition of the Chinese character A, which includes the sequence of component decomposition, the geometric feature measures of strokes, and the window boundaries (including the tolerance value) that were used to identify the strokes of each component.

In deriving the rule of component decomposition of character A, we need to define the jth set of the geometric feature measures as $J=\{f_j(1) \ldots f_j(L)\}$, where $f_j(i)$, which equals $(fx_j(i), fy_j(i))$, is a member of the set $M_i$ which includes both the x and y geometric feature measures of strokes. For all the handwritten samples (for learning), the minimum bounding area occupied by the jth set of geometric feature measures of all the strokes in a component is denoted by W(i,j). When a tolerance zone of width δ is added to the window W(i,j), an enlarged window W'(δ, i, j) is obtained. The enlarged window W'(δ, i, j) is used in deriving the rules of component decomposition such that a greater variation in the relative component size can be accommodated. For all the learning samples of the Chinese character A, the total erroneous decomposition strokes in the ith component is denoted as $e_A(δ, i, j, k)$, where the kth decomposition sequence and the jth set of geometric feature measures are used in the component decomposition The total erroneous decomposition strokes of the entire character, $E_A(δ, j, k)$, is defined as follows:

$$E_A(δ, j, k) = \sum_{i=1}^{L} e_A(δ, i, j, k) \qquad \text{Eqn. 2}$$

The above formula represents the total erroneous decomposition strokes for the kth decomposition sequence and the jth set of geometric feature measures. For all the possible decomposition sequences and geometric feature measures of strokes, the minimum erroneous decomposition strokes $\gamma_A(δ)$ is obtained by the following equation:

$$\gamma_A(δ) = \min_{1 \leq j \leq M, 1 \leq k \leq N} E_A(δ, j, k) = E_A(δ, j', k') \qquad \text{Eqn. 3}$$

The rule of component decomposition of the Chinese character A is thus to utilize the j'th set of geometric feature measures and the k'th decomposition sequence, which collectively result in minimum erroneous decomposition strokes.

Figure 7:
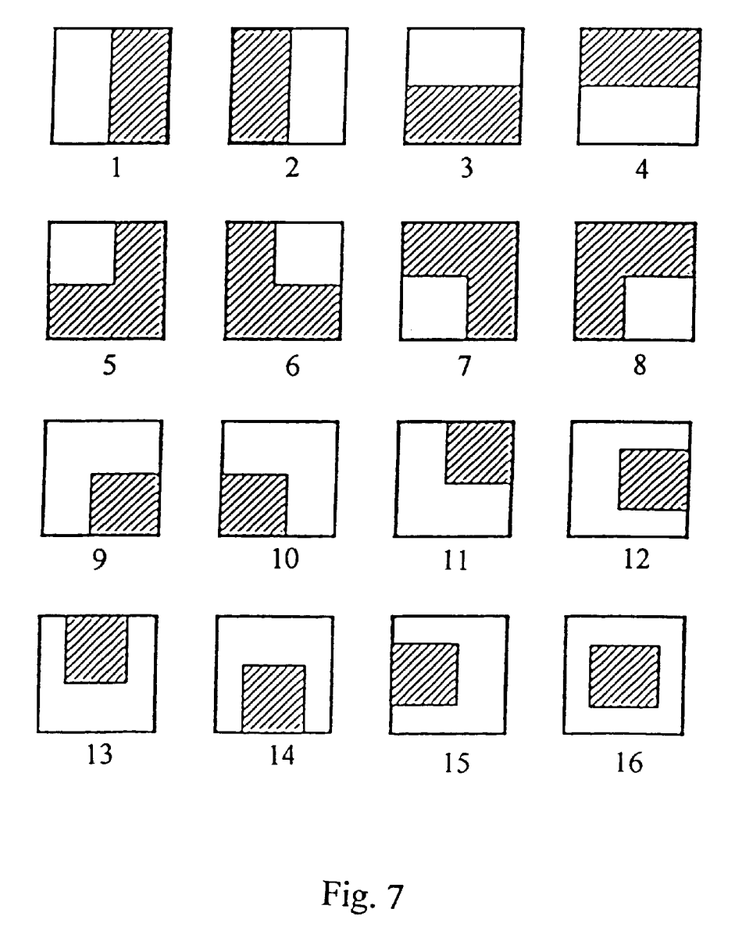
FIG. 7 shows the sixteen types of spatial relationships between a decomposed component and its neighboring component(s), each spatial relationship is indicated by a position code.
Figure 8A:
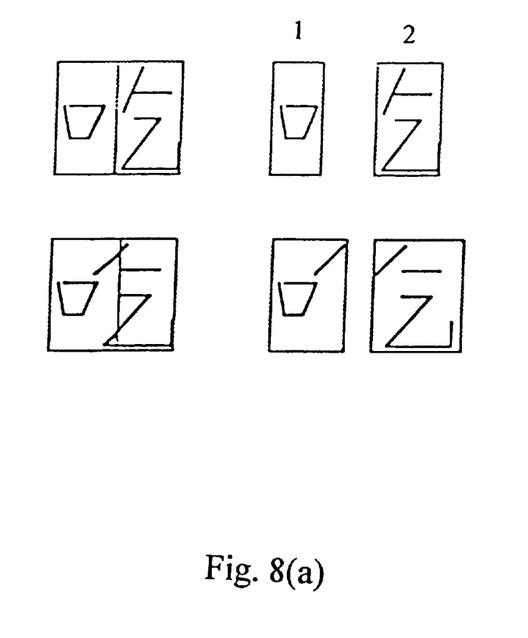
FIG. 8a shows an example of how the strokes of neighboring component(s) may be erroneously included in a decomposed component of the Chinese character 乙; an erroneous stroke appears to the right of the decomposed component, as opposed to the correctly decomposed components shown at above.
Figure 8B:
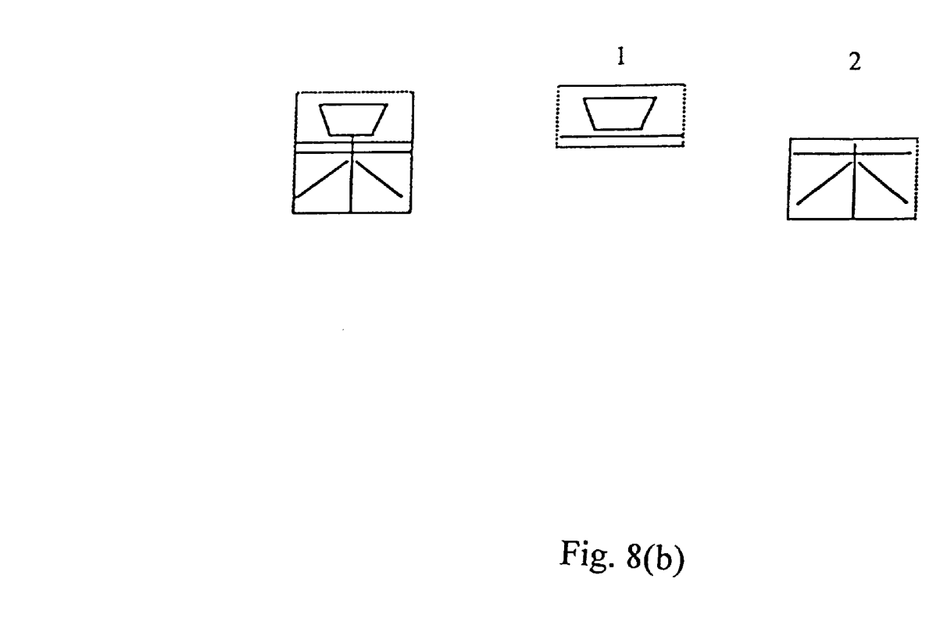
FIG. 8b shows another example of how the strokes of neighboring component(s) may be erroneously included in a decomposed component of the Chinese character 冬; an erroneous stroke appears to the bottom of the decomposed component, as opposed to the correctly decomposed components shown at left.

When a component is decomposed from an input script, there are 16 possible spatial relationships between the decomposed component and its neighboring component(s) remaining in the script. FIG. 7 shows the sixteen types of spatial relationships between a decomposed component and its neighboring component(s). Each spatial relationship is indicated by a position code. When different Chinese characters contain a common component, the component may be assigned different codes, respectively, for these characters in the component decomposition process. As discussed earlier, when a component is decomposed from a character, the strokes of the neighboring components may be erroneously included. FIG. 8a shows an example of how the strokes of neighboring component(s) may be erroneously included in a decomposed component of the Chinese character 一. In FIG. 8a, the Chinese character 一 consists of components 々 and 二, and has a left-right component relationship in the character structure. An erroneous stroke appears to the right of the decomposed component 々. FIG. 8b shows another example of how the strokes of neighboring component(s) may be erroneously included in a decomposed component of the Chinese character 一. As shown in FIG. 8b, an erroneous stroke appears in the bottom area of the decomposed component 々. For these two different cases, preferably the stroke correspondence rules for component 々 are different. In other words, it is preferred that, for components belonging to the same category but with different position codes, different stroke correspondence rules are assigned to facilitate correct stroke correspondence.

In a preferred embodiment of the method disclosed in the present invention, a pattern code is provided to denote the pattern of a component category, and a rule code is provided to denote the stroke correspondence rules of one component category with a certain position code. Any given component category has only one pattern code, but may have more than one rule code. As described earlier, a mapping table is used to record the mapping relations between the rule code(s) and a pattern code. During character recognition, this mapping table is used for retrieving data from the reference database.

In summary, in the example embodiment of the hierarchical database structure disclosed in the present invention, the database of character description stores the rule code(s) of the constituent component(s) and the character structure for all the characters included in the vocabulary. The database of stroke correspondence rules of components stores stroke correspondence rules for all the components denoted by the above mentioned rule codes. The database of character structure stores the synthesis rules of character patterns, the decomposition rules of character structures, and the spatial relationships between components, for all the 208 character structures utilized in a preferred embodiment of this invention. The database of standard component patterns stores the coordinates of extreme points of line segments constituting the standard patterns of components. And the database of spatial relationships between strokes of components stores the spatial relationships between strokes of each component. When an input script is matched against a template character, the input script is decomposed into constituent component(s) according to the decomposition rule of that character described as a rule code (stored in the database of character description). Then, the stroke correspondence rules are retrieved from the database of stroke correspondence rules of components via the rule code(s) of that template character. After the matching is completed at the stroke level, the character distance (i.e., error) is computed using the database of spatial relationships between strokes of components and the character pattern, which is synthesized using the database of standard component patterns and the database of character structure.

The hierarchical database structure disclosed in the present invention can be further refined. Among the 16 spatial relationships shown in FIG. 7, position codes 9 through 16 only occur in characters with surrounding structures. Thus, a component category with a position code numbered between 9 and 16 must have an enclosing shape, and if a component has an enclosing shape, it can only have a position code from 9 to 16. However, any component may have more than one position code if its code is numbered between 1 and 8. Therefore, in the component decomposition of any of the 5401 characters, if a component category has any of the eight position codes, from 1 to 8, then the storage space of the stroke correspondence rules could be increased by as much as eight times. In order to reduce the requirement of the storage space, an improvement was adopted in the component decomposition. If, in decomposing the characters, a component category occurs in both position codes 1 and 2, then the decomposition sequence of components will be restricted such that the component category has only one position code of either 1 or 2. Likewise, the component category is restricted to have a position code of either 3 or 4, and either of 5, 6, 7 or 8. The derivation of decomposition rules described above was slightly modified when the minimum erroneous decomposition strokes $\gamma_A(\delta)$ does not equal zero. When this occurs, the natural sequence of component decomposition n predefined for character structure $\alpha$ is adopted as the decomposition sequence of components. When the k'th sequence derived from Eqn. 3, above, is not the natural sequence n, then the decomposition rule of character category A is renewed as follows:

$$\gamma_{An}(\delta) = \min_{1 \leq j \leq M} E_A(\delta, j, n) = E_A(\delta, j'', n) \qquad \text{Eqn. 4}$$

where the natural sequence n and the j''th set of geometric feature measures of strokes are adopted in the decomposition rule of components.

After the above refinements, the number of rule codes is at most three times the number of pattern codes for the entire 5.401 character categories. In an example embodiment, two bytes are needed to store the information of stroke types for each stroke, and five bytes are needed to store the geometric feature measures. The space required by the basic stroke types is about 6 Kbytes for the stroke correspondence rules of components, and a total space of 49 Kbytes was adequate to store all the geometric feature measures of strokes. The decomposition rules occupied about 60 Kbytes. For the database of stroke correspondence rules of components, the required storage space was less than 115 Kbytes with the hierarchical structure of the present invention. Without the hierarchical representation, the required space was about 461 Kbytes.

Table 1 compares the amount of storage space required with and without the hierarchical representation of the present invention. The total space requirement using the hierarchical representation is about one-fourth of that without the hierarchical representation. The space saving will be even more significant if a larger vocabulary is to be used.

TABLE 1

| Structural Information | Space Requirement (Kbytes) | |
| --- | --- | --- |
|  | With Hierarchical Representation | Without Hierarchical Representation |
| Stroke Correspondence Rules | <115 | 461 |
| Character Patterns | 135 | >250 |
| Spatial Relationships between Strokes | 13 | 250 |
| Total Space Requirement | <263 | >961 |

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for on-line recognition of Chinese characters which utilizes a hierarchical representation of reference databases and a rule-based character recognition approach, wherein each character consists of one or more constituent components and each component consists one or more strokes, said hierarchical representation of reference databases comprising a set of following databases:

(a) a database of character description which stores rule codes of constituent components and character structures for a plurality of template characters included in a predetermined vocabulary, each of said character structures providing spatial relationships between said constituent components of a template character;

(b) a database of stroke correspondence rules of components which stores stroke correspondence rules for all the components denoted by the rule codes described in database (a);

(c) a database of character structures which stores synthesis rules of character patterns, decomposition rules of character structures, and spatial relationships between components, for all the character structures included in the system (d) a database of standard component patterns which stores normalized standard patterns of components; and (e) a database of spatial relationships between strokes of components which stores spatial relationships between strokes of each component;

(f) wherein said databases of (a), (b) and (c) collectively and hierarchically constitute a database of stroke correspondence rules of characters for stroke recognition; said databases of (a) and (e) collectively and hierarchically constitute a database of spatial relationships between strokes of characters for calculating a character distance; and said databases of (a), (c) and (d) collectively and hierarchically constitute a database of character patterns for synthesizing a template character for use in character discrimination.

2. A method for on-line recognition of Chinese characters according to claim 1 wherein each character structure of said template characters in said database of character description is represented by a two-part multiple digit code, the first part being the number of components in said character structure and the second part being the seriatim number of said character structure in a group consisting of character structures of the same number of components, and each component is represented also by a two-part multiple-digit code, the first part being the stroke number of each component, and the second part being the seriatim number of that component in a group consisting of components having the same stroke number.

3. A method for on-line recognition of Chinese characters according to claim 1 wherein each of said stroke correspondence rules in said database of stroke correspondence rules of components for describing a standard stroke contains one or more geometric feature measures associated with that standard stroke.

4. A method for on-line recognition of Chinese characters according to claim 1 wherein said database of character structures is structured such that each character structure is allowed to contain more than one decomposition rule, and is allowed to have different decomposition sequences for different template characters of the same structure, so as to enhance stability of decomposition.

5. A method for on-line recognition of Chinese characters according to claim 4 wherein said decomposition sequence of a character structure contains at least a natural sequence, which is the sequence based on human writing habits.

6. A method for on-line recognition of Chinese characters according to claim 1 wherein each of said standard patterns of components in said database of standard component patterns is represented by the coordinates of extreme points of line segments constituting said standard pattern of said component.

7. A method for on-line recognition of Chinese characters according to claim 1 which comprises the steps of:

(a) using said database character description and said database of character structures to decompose a template character into components according to a predetermined decomposition sequence; and (b) using said database of stroke correspondence rules of components to find matching strokes in an input character.

8. A method for on-line recognition of Chinese characters according to claim 7 which further comprises the step of using said database character description, said database of spatial relationships between strokes of components, and said database of standard component patterns, and said database of character structures, to calculate a discrimination function for a template character of a predetermined decomposition sequence.

9. A method for on-line recognition of Chinese characters according to claim 8 which further comprises the step of using said database character description, said database of character structures, and said database of standard component patterns to perform detail character recognition.

10. A method for on-line recognition of Chinese characters according to claim 1 which further comprises the step of using a plurality of geometric features, in conjunction with a variation of possible decomposition sequences and character samples, to derive the best decomposition rule for each character.

11. A hierarchically structured reference database system for on-line recognition of Chinese characters which utilizes a rule-based character recognition approach, said hierarchically structured reference database system comprising a set of following databases:

(a) a database of character description which stores the rule codes of the constituent components and the character structure, which provides the spatial relationships between the constituents, for a plurality of template characters included in a predetermined vocabulary;

(b) a database of stroke correspondence rules of components which stores stroke correspondence rules for all the components denoted by the rule codes described in database (a);

(c) a database of character structures which stores the synthesis rules of character patterns, the decomposition rules of character structures, and the spatial relationships between components, for all the character structures included in the system (d) a database of standard component patterns which stores normalized standard patterns of components; and (e) a database of spatial relationships between strokes of components which stores the spatial relationships between strokes of each component;

(f) wherein said databases of (a), (b) and (c) collectively and hierarchically constitute a database of stroke correspondence rules of characters for stroke recognition; said databases of (a) and (e) collectively and hierarchically constitute a database of spatial relationships between strokes of characters for calculating a character distance; and said databases of (a), (c) and (d) collectively and hierarchically constitute a database of character patterns for synthesizing a template character for use in character discrimination.

12. A hierarchically structured reference database system for on-line recognition of Chinese characters according to claim 11 wherein each character structure of said template characters in said database of character description is represented by a two-part multiple digit code, the first part being the number of components in said character structure and the second part being the seriatim number of said character structure in a group consisting of character structures of the same number of components, and each component is represented also by a two-part multiple-digit code, the first part being the stroke number of each component, and the second part being the seriatim number of that component in a group consisting of components having the same stroke number.

13. A hierarchically structured reference database system for on-line recognition of Chinese characters according to claim 11 wherein each of said stroke correspondence rules in said database of stroke correspondence rules of components for describing a standard stroke contains one or more geometric feature measures associated with that standard stroke.

14. A hierarchically structured reference database system for on-line recognition of Chinese characters according to claim 11 wherein said database of character structures is structured such that each character structure is allowed to contain more than one decomposition rule, in which different decomposition rules are allowed to have different decomposition sequences for different template characters of the same structure, so as to enhance stability of decomposition.

15. A hierarchically structured reference database system for on-line recognition of Chinese characters according to claim 14 wherein said decomposition sequences of each character structure contain at least a natural sequence, which is the sequence based on human writing habits.

16. A hierarchically structured reference database system for on-line recognition of Chinese characters according to claim 11 wherein each of said standard patterns of components in said database of standard component patterns is represented by the coordinates of extreme points of line segments constituting said standard pattern of said component.

* * * * *